(12) United States Patent
Getschel et al.

(10) Patent No.: US 7,946,643 B2
(45) Date of Patent: May 24, 2011

(54) TONNEAU COVER

(76) Inventors: Scott Getschel, Calagry (CA); Randy Reynolds, Calagry (CA)

( * ) Notice: Subject to any disclaimer, the term of this patent is extended or adjusted under 35 U.S.C. 154(b) by 240 days.

(21) Appl. No.: 12/048,158

(22) Filed: Mar. 13, 2008

(65) Prior Publication Data

US 2009/0230718 A1 Sep. 17, 2009

(51) Int. Cl.
B60P 7/02 (2006.01)

(52) U.S. Cl. .................................................. 296/100.1

(58) Field of Classification Search ............... 296/100.1, 296/100.18, 37.6, 3, 39.2, 100.06, 26.09, 296/105, 100.09, 39.1, 100.16; 224/404, 224/403, 405; 410/106, 110
See application file for complete search history.

(56) References Cited

U.S. PATENT DOCUMENTS

| | | | | | |
|---|---|---|---|---|---|
| 3,069,199 | A | * | 12/1962 | Reardon et al. | 296/100.07 |
| 3,367,347 | A | * | 2/1968 | Smith | 296/100.18 |
| 3,420,570 | A | * | 1/1969 | Kunz | 296/100.06 |
| 3,765,717 | A | * | 10/1973 | Garvert | 296/100.07 |
| 3,790,207 | A | * | 2/1974 | Anderson | 296/164 |
| 3,858,744 | A | * | 1/1975 | Garvert | 217/60 G |
| 4,036,521 | A | * | 7/1977 | Clenet | 296/100.15 |
| 4,124,247 | A | * | 11/1978 | Penner | 296/100.1 |
| 4,531,775 | A | * | 7/1985 | Beals | 296/100.06 |
| 4,627,658 | A | * | 12/1986 | Vold et al. | 296/100.1 |
| D287,710 | S | * | 1/1987 | Pino | D12/404 |
| 4,815,786 | A | * | 3/1989 | McRay | 296/165 |
| 4,850,770 | A | * | 7/1989 | Millar, Jr. | 410/110 |
| 4,901,963 | A | * | 2/1990 | Yoder | 24/489 |
| 4,943,108 | A | * | 7/1990 | Turnbull | 296/100.07 |
| 5,009,457 | A | * | 4/1991 | Hall | 296/3 |
| 5,011,214 | A | * | 4/1991 | Friesen et al. | 296/100.09 |
| 5,110,021 | A | * | 5/1992 | Dawson, Jr. | 224/405 |
| 5,165,750 | A | * | 11/1992 | Pirhonen | 296/100.18 |
| 5,228,739 | A | * | 7/1993 | Love | 296/100.02 |
| 5,344,159 | A | * | 9/1994 | Powell | 296/100.09 |
| 5,503,450 | A | * | 4/1996 | Miller | 296/100.08 |
| 5,904,393 | A | * | 5/1999 | Yoder | 296/100.17 |
| 5,988,728 | A | * | 11/1999 | Lund et al. | 296/100.03 |
| 6,042,175 | A | * | 3/2000 | Williams | 296/185.1 |
| 6,095,587 | A | | 8/2000 | Shirlee et al. | |
| 6,106,050 | A | * | 8/2000 | McLeod | 296/100.06 |
| 6,224,140 | B1 | * | 5/2001 | Hoplock | 296/100.17 |
| 6,254,169 | B1 | * | 7/2001 | Arthur | 296/100.07 |
| 6,256,844 | B1 | * | 7/2001 | Wheatley | 24/265 CD |
| 6,340,194 | B1 | * | 1/2002 | Muirhead et al. | 296/100.06 |
| 6,340,195 | B1 | * | 1/2002 | Hall et al. | 296/100.07 |
| 6,428,079 | B1 | * | 8/2002 | Van Dyke | 296/100.06 |
| 6,598,930 | B1 | * | 7/2003 | Tilton | 296/100.06 |
| 6,607,229 | B1 | * | 8/2003 | McIntosh | 296/26.06 |

(Continued)

*Primary Examiner* — Kiran B. Patel
(74) *Attorney, Agent, or Firm* — Maxey Law Offices, PLLC; Stephen Lewellyn

(57) ABSTRACT

A tonneu cover assembly mountable to a open top truck bed of a pick up truck for covering the bed. The cover assembly includes a pair of side rail caps that are attachable to the side rails of the bed by a clamping system. A pair of door panels are hingedly mounted on respective side rail caps. The door panels are rotatable between a closed position where the bed is covered and open positions permitting access to the bed. A pair of actuators are connected to respective door panels and are operable to rotate the door panels between the closed and open positions. The actuators may operate to rotate one door more quickly than the second when opening the doors, and then reverse the speed of the doors when closing them enabling correct engagement between the inward sides of the doors. A quick release mechanism is provided to decouple a door from an actuator in case of a failure.

17 Claims, 11 Drawing Sheets

U.S. PATENT DOCUMENTS

| | | |
|---|---|---|
| 6,616,210 B1 * | 9/2003 | Massey ................. 296/100.1 |
| 6,663,160 B2 * | 12/2003 | Yarbrough et al. ...... 296/100.06 |
| 6,702,360 B1 * | 3/2004 | Santos et al. ............ 296/100.07 |
| 6,799,784 B2 * | 10/2004 | Rios ...................... 296/26.06 |
| 6,902,222 B2 * | 6/2005 | Nykiel et al. ............ 296/100.02 |
| 7,093,881 B2 * | 8/2006 | Rusu ..................... 296/100.07 |
| 7,246,839 B1 * | 7/2007 | Nyberg .................. 296/100.06 |
| 7,296,837 B2 * | 11/2007 | Niedziela et al. ......... 296/3 |
| 2001/0038225 A1 * | 11/2001 | Muirhead ............... 296/100.06 |
| 2005/0225117 A1 * | 10/2005 | Miskech et al. .......... 296/183.1 |
| 2007/0210608 A1 | 9/2007 | Klein |
| 2009/0230718 A1 * | 9/2009 | Getschel et al. .......... 296/100.1 |

* cited by examiner

TONNEAU COVER

FIELD OF THE INVENTION

The present invention relates generally to a tonneau cover assembly for a truck bed, and more particularly, relating to a tonneau cover assembly having a pair of doors that are hingeably attachable to the side rails of a truck bed.

BACKGROUND OF THE INVENTION

Pick-up trucks make up a large percentage of the vehicles on the road today. Conventional pick-up trucks generally have an open truck bed of various dimensions located aft of the cab of the truck. The open truck bed allows for hauling of different types of cargo and allows easy access to the truck bed. However, multiple problems are associated with an open truck bed. One, is the open truck bed is exposed to the weather elements and debris that can accumulate within the truck bed. Further, cargo loaded into the truck bed is susceptible to the possibility of being stolen, damaged by the weather, or blown from the truck bed. Additionally, an open truck bed creates drag on a traveling truck by air impinging on the tailgate and sidewalls reducing fuel economy.

To overcome these problems many different truck bed covers of a myriad of designs have been devised for the purpose of covering truck beds. These truck bed covers allow for greater security of cargo, minimize exposure to weather elements, prevent smaller cargo from being blown from the truck bed, and reduce drag on the truck.

A first heretofore devised truck bed cover includes a flexible sheet of material rolled upon a spool positioned behind the cab of the truck. The sheet material is unrolled from the spool to cover the truck bed and is retracted back onto the spool to uncover the truck bed. A second type of truck bed cover is a soft cover, usually constructed of vinyl or fabric material, which are usually fastened to the truck bed by snaps or guide rails. A third general type of truck bed cover is a hard cover. A hard cover is made from rigid plastic or fiberglass material and is comprised of one or more solid doors, hinged to the truck bed. Hard covers tend to provide better covering of the bed and greater security of the cargo within the bed. However, hard covers tend to be heavy and difficult to open, difficult to attach to the truck bed, and limit the available cargo space above the side rails of the truck bed.

Accordingly, there is a need for a hard truck bed covering of an improved construction and operation that is easily opened, easily attached without damaging the truck bed, and which does not limit the cargo space available above the side rails of the truck bed.

SUMMARY OF THE INVENTION

The preferred embodiments of the present invention addresses these needs by providing a truck bed cover that is power operated to open and close, this is easily mounted to a truck bed without damaging the bed, and which does not limit the cargo space available above the side rails of the truck bed.

To achieve these and other advantages, in general, in one aspect, a cover assembly for covering an open top of a truck bed having two vertical sidewalls each having a top surface defining an inwardly extending side rail is provided. The cover assembly includes a first door and a second door, each of the doors having laterally spaced first and second sides and longitudinally spaced first and second ends. A first side rail cap and a second side rail cap, each of the side rail caps having an inside edge, an outside edge, a top surface and a bottom surface, the inside edge defining a ledge having a ledge surface downwardly spaced from the top surface. Two or more rail cap attachment means. The first side rail cap being detachably mountable to the side rail of one sidewall of the truck bed with the bottom surface of the first side rail cap in abutment with the side rail and with the inside edge facing inwardly, and being removably secured to the side rail by one of two or more rail cap attachment means in engagement with the ledge surface of said first side rail cap and the side rail. The second side rail cap being detachably mountable to the side rail of the other sidewall of the truck bed with the bottom surface of the second side rail cap in abutment with the side rail and with the inside edge facing inwardly, and being removably secured to the side rail by at least one of the two or more rail cap attachment means in engagement with the ledge surface of the second side rail cap and the side rail. The first door being positionable and hingedly connectable at the first side thereof to the first side rail cap along the ledge thereof for rotation on a first hinge axis parallel to the inside edge of the first side rail cap permitting the second side of the first door to be swung between a closed position and open positions. The second door being positionable and hingedly connectable at the first side thereof to the second side rail cap along the ledge thereof for rotation on a second hinge axis parallel to the inside edge of the second side rail cap permitting the second side of said second door to be swung between a closed position and open positions. Wherein the second sides of the first and the second doors rotate towards and away from one another between the closed position and the open positions, and being engagable with one another in the closed position. The top surfaces of the first and the second doors being flush with the top surfaces of the first and the second rail caps respectively when the cover assembly is in the closed position.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Reference will now be made in detail to the preferred embodiments of the present invention, examples of which are illustrated in the accompanying drawings.

Figure 1:
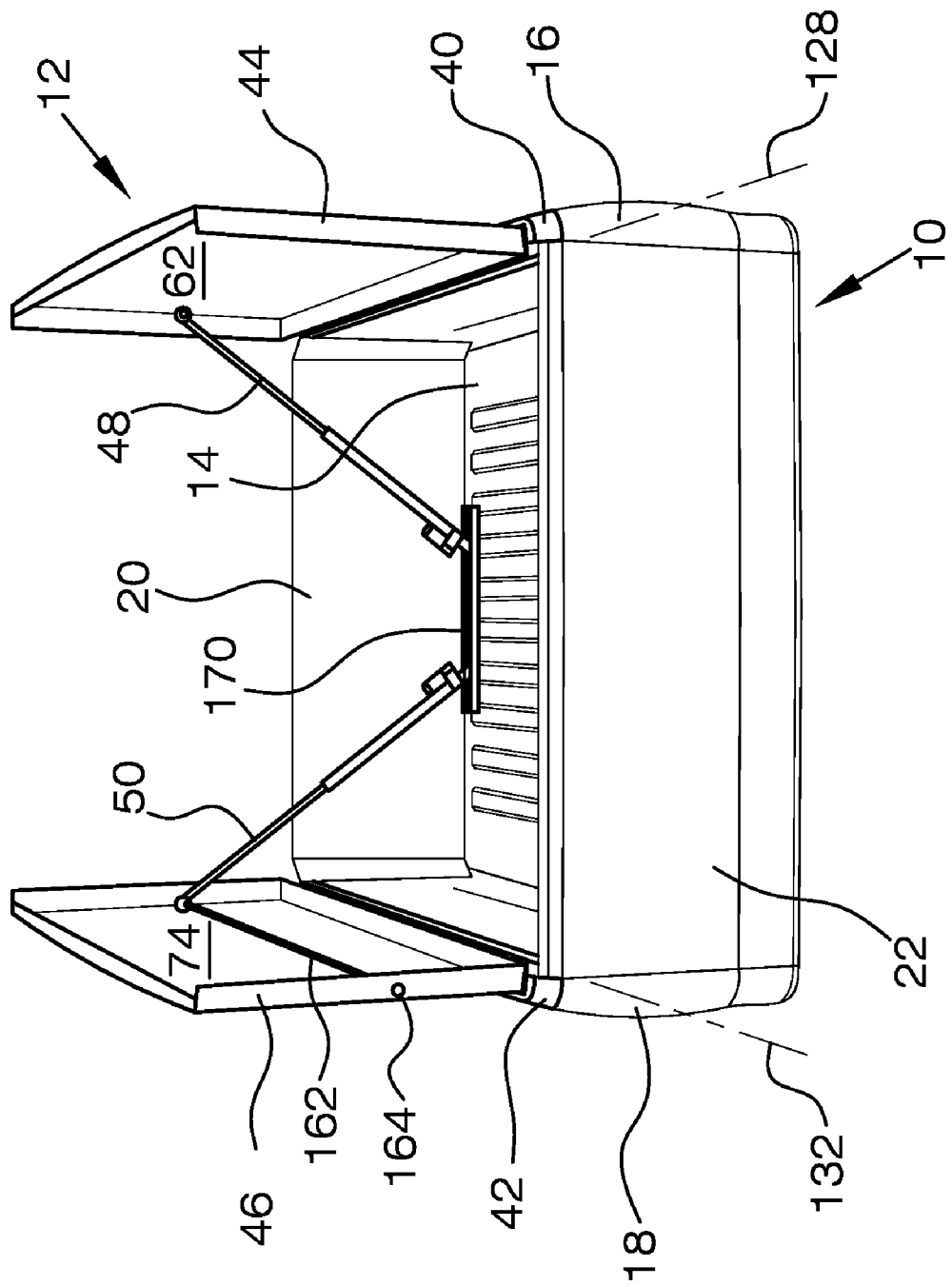
FIG. 1 is a perspective view of a conventional truck bed with the cover assembly in accordance with the principles of the present invention mounted thereto and in an open position permitting access to the truck bed.
Figure 3:
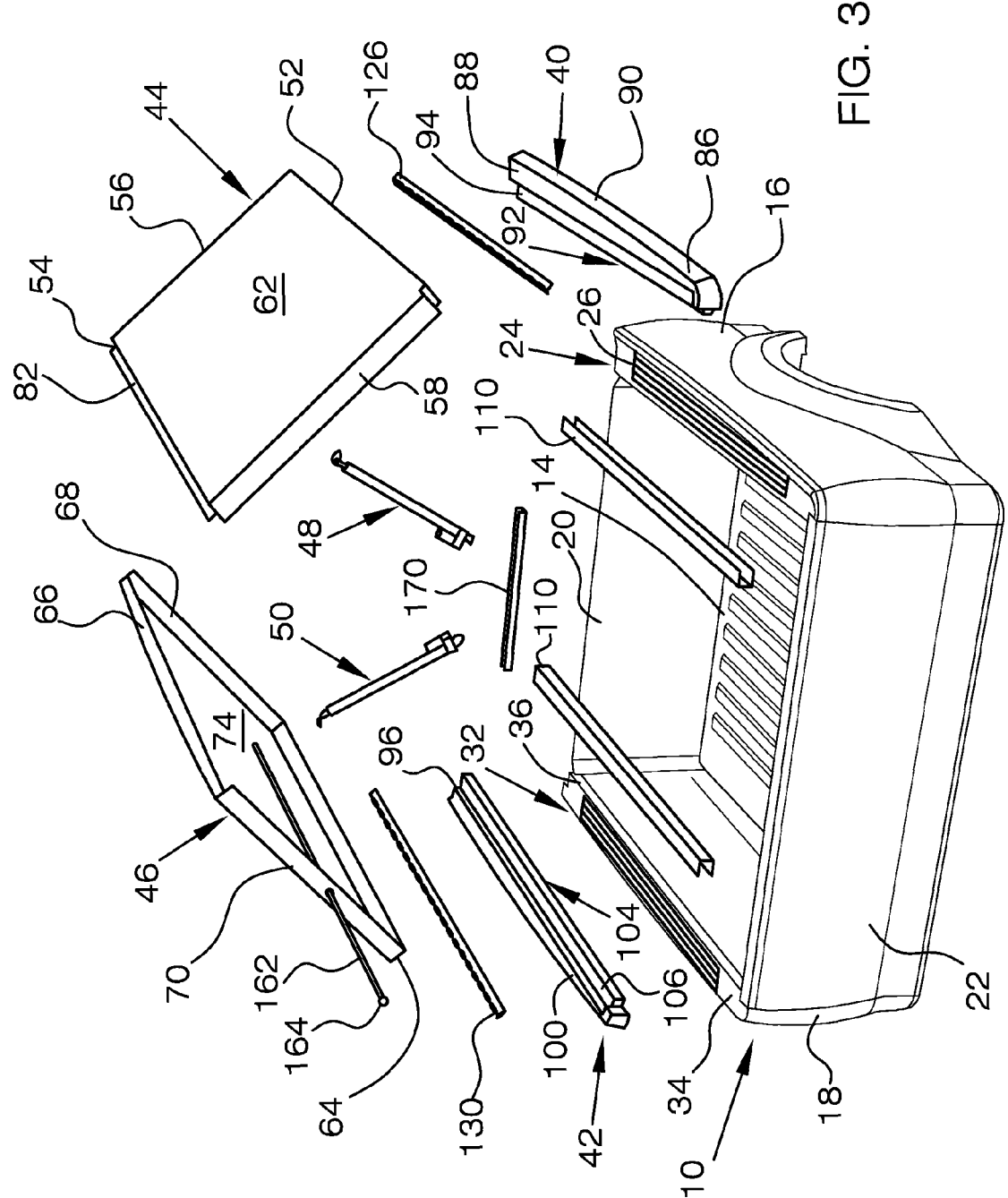
FIG. 3 is an exploded perspective view of the cover assembly.
Figure 4:
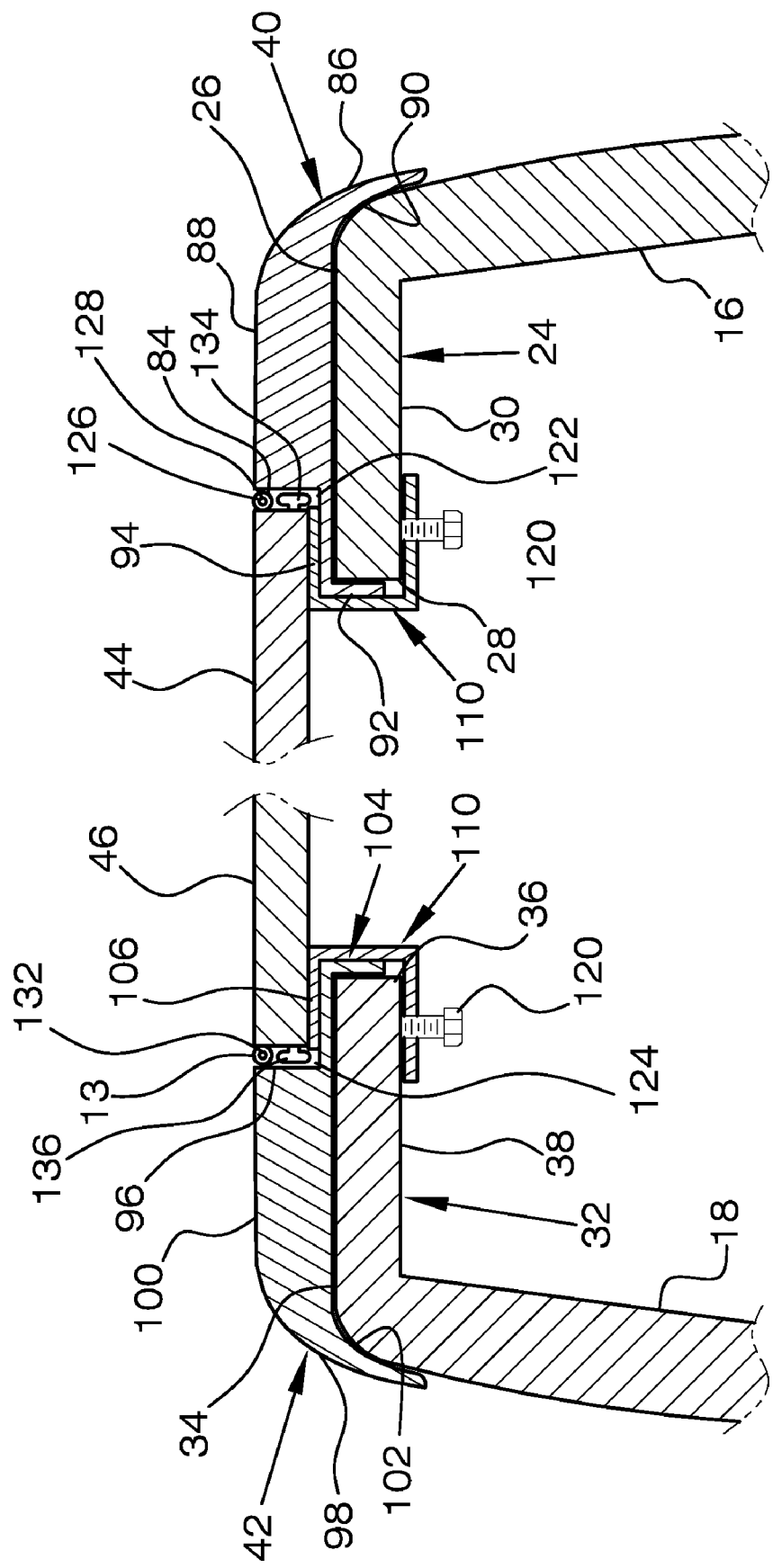
FIG. 4 is a cross sectional taken along line 4-4 in FIG. 2 illustrating the details of the mounting arrangement between the cover assembly and the truck bed.

In FIG. 1, there is illustrated a conventional open topped pick-up truck bed 10 with a cover assembly 12 constructed in accordance with the present invention shown in an open configuration permitting access to the interior of the truck bed. The conventional truck bed 10 has a floor 14 enclosed by two vertical sidewalls 16 and 18, a front wall 20, and a tailgate 22. The sidewalls 16 and 18, the front wall 20 and the tailgate 22 extend upwardly from the floor 14 creating an interior cargo storage area. Sidewall 16 has a top surface defining an inwardly extending side rail 24 having a top surface 26, an inner edge 28, and a bottom surface 30, as best shown in FIGS. 3 and 4. Likewise, sidewall 18 has a top surface defining an inwardly extending side rail 32 having a top surface 34, an inner edge 36, and a bottom surface 38.

Figure 2:
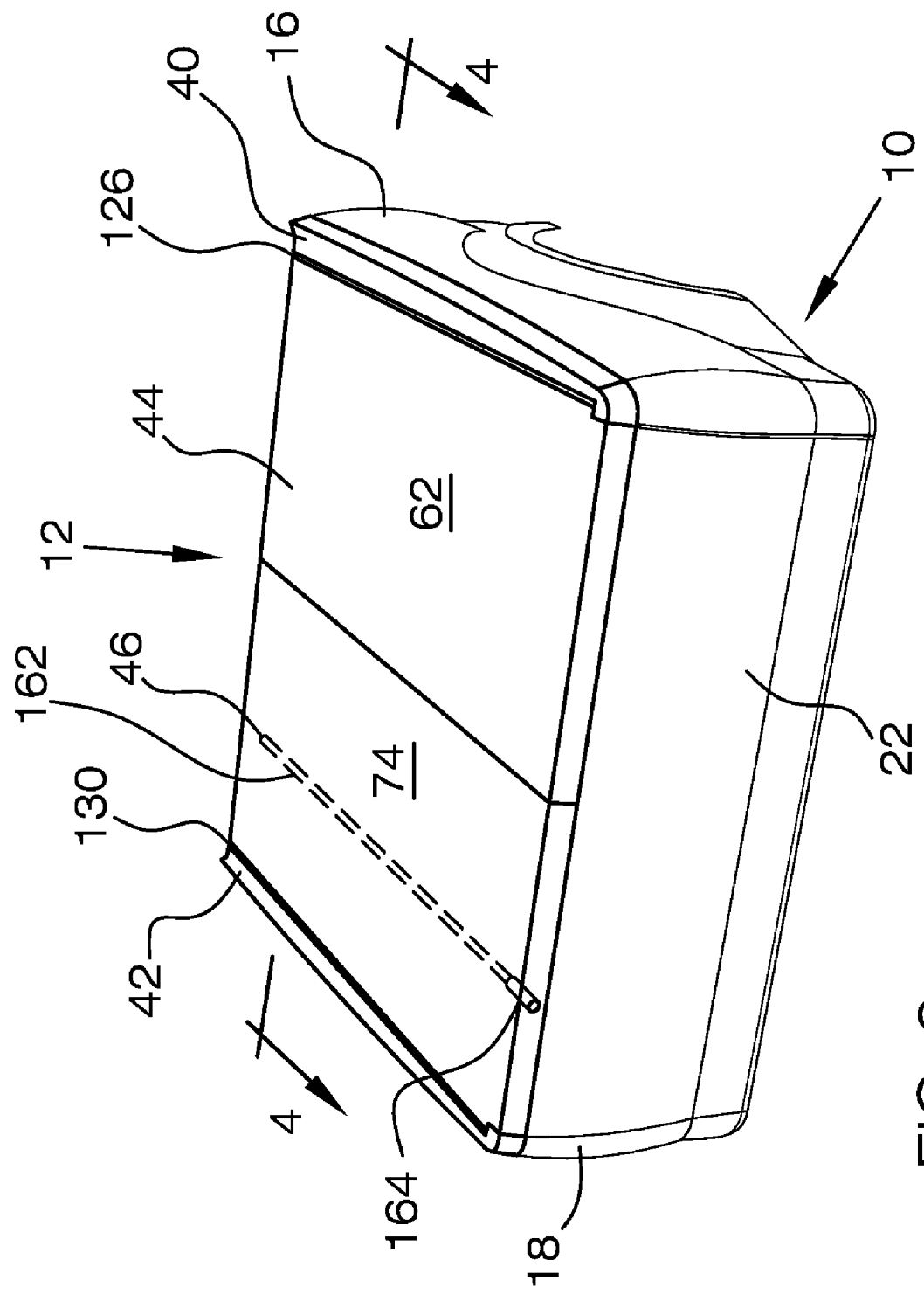
FIG. 2 is the same perspective view of FIG. 1 with the cover assembly in a closed position covering and securing the truck bed.

The cover assembly 12 includes a first side rail cap 40, a second side rail cap 42, a first door 44, and a second door 46. The first side rail cap 40 is detachably mountable to the top surface 26 of side rail 24, and the second side rail cap 42 is detachably mountable to the top surface 34 of the other side rail 32. The first door 44 is hingedly connected to the first side rail cap 40 and the second door 46 is hingedly connected to the second side rail cap 42. The cover assembly 12 may also include a first actuator 48 connected to the first door 44 and a second actuator 50 connected to the second door 46. The actuators 48 and 50 are operable to open the doors 44 and 46, as shown in FIG. 1, and close the doors as shown in FIG. 2, as explained in more detail below.

With reference to FIGS. 3 and 4, the first door 44 has laterally spaced first and second sides 52 and 54, longitudinally spaced first and second ends 56 and 58, a top surface 60, and a bottom surface 62. Likewise, the second door 46 has laterally spaced first side and second sides 64 and 66, longitudinally spaced first and second ends 68 and 70, a top surface 72, and bottom surface 74. Each door 44 and 46 may be made from a fiberglass material or any other suitable material. The top surfaces 62 and 72 may be curved for increased strength and to prevent water from accumulating on the surfaces.

The first and second side rail caps 40 and 42 are constructed to have a low profile while at the same time permit easy attachment, and provide a stable and secure attachment point for the doors 44 and 46. The side rail caps 40 and 42 may be constructed to fit a particular vehicle model. The first side rail cap 40 has an inside edge 84, and outside edge 86, a top surface 88, and a bottom surface 90. A ledge 92 extends along the inside edge 84 and has a ledge surface 94 that is downwardly spaced from the top surface 88. Likewise, the second side rail cap 42 has an inside edge 96, an outside edge 98, a top surface 100, and a bottom surface 102. A ledge 104 extends along the inside edge 96 and has a ledge surface 106 that is downwardly spaced from the top surface 100.

The first side rail cap 40 is detachably mounted to the side rail 24 of the sidewall 16 with the bottom surface 90 in abutment with the top surface 26 of the side rail and with the inside edge 96 facing inwardly towards the cargo storage area. Likewise, the second side rail cap 42 is detachably mounted to the side rail 32 of the sidewall 18 with the bottom surface 102 in abutment with the top surface 34 and with the inside edge 96 facing inwardly towards the cargo storage area. Each side rail cap 40 and 42 is detachably securable to the side rails 24 and 32, respectively, by one or more rail cap attachment means 108. The rail cap attachment means 108 permits the detachable securment of the rail caps 40 and 42 to the side rails 24 and 32 without requiring holes to be drilled through the side rails, or without the need of special tools.

The first door 44 is hingedly connected at the first side 52 thereof to the first side rail cap 40 along the ledge 92 by a hinge 126 having a hinge axis 128. The first door 44 is rotatable about the hinge axis 128 between a closed and open position. The hinge axis 128 may be parallel to the inside edge 84 of the first rail cap 40. The second door 46 is hingedly connected at the first side 64 to the second side rail cap 42 along the ledge 104 by a hinge 130 having a hinge axis 132. The second door is rotatable about the hinge axis 132 between a closed and open position. The hinge axis 132 may be parallel to the inside edge 96 of the second rail cap 42. The first and second hinge axis 128 and 132 may be perpendicular to tailgate 22. The second sides 54 and 66 are rotated or swung towards and away from one another as the doors 44 and 46 are opened and closed.

The doors 44 and 46 are generally oriented horizontal when in the closed position, as shown in FIG. 2, and are dimensioned to cover the open bed 10. The doors 44 and 46 each may be of a length such that the ends 58 and 70 extend across the tailgate 22, thereby preventing the tailgate from being opened when the doors are in the closed position. In the closed position, the rotation of each door 44 and 46 about its respective hinge axis 128 and 132 is considered to be zero degrees. The doors 44 and 46 are rotatable about their respective hinge axes 128 and 132 from between zero degrees and about ninety degrees where the doors are generally vertically orientated, as shown in FIG. 1. In this manner, cargo that may have a height greater than that of the sidewalls 16 and 18 may be loaded into the cargo area of the bed 10 without requiring removal of the cover assembly 12, as in prior hard truck bed covering systems.

Figure 11:
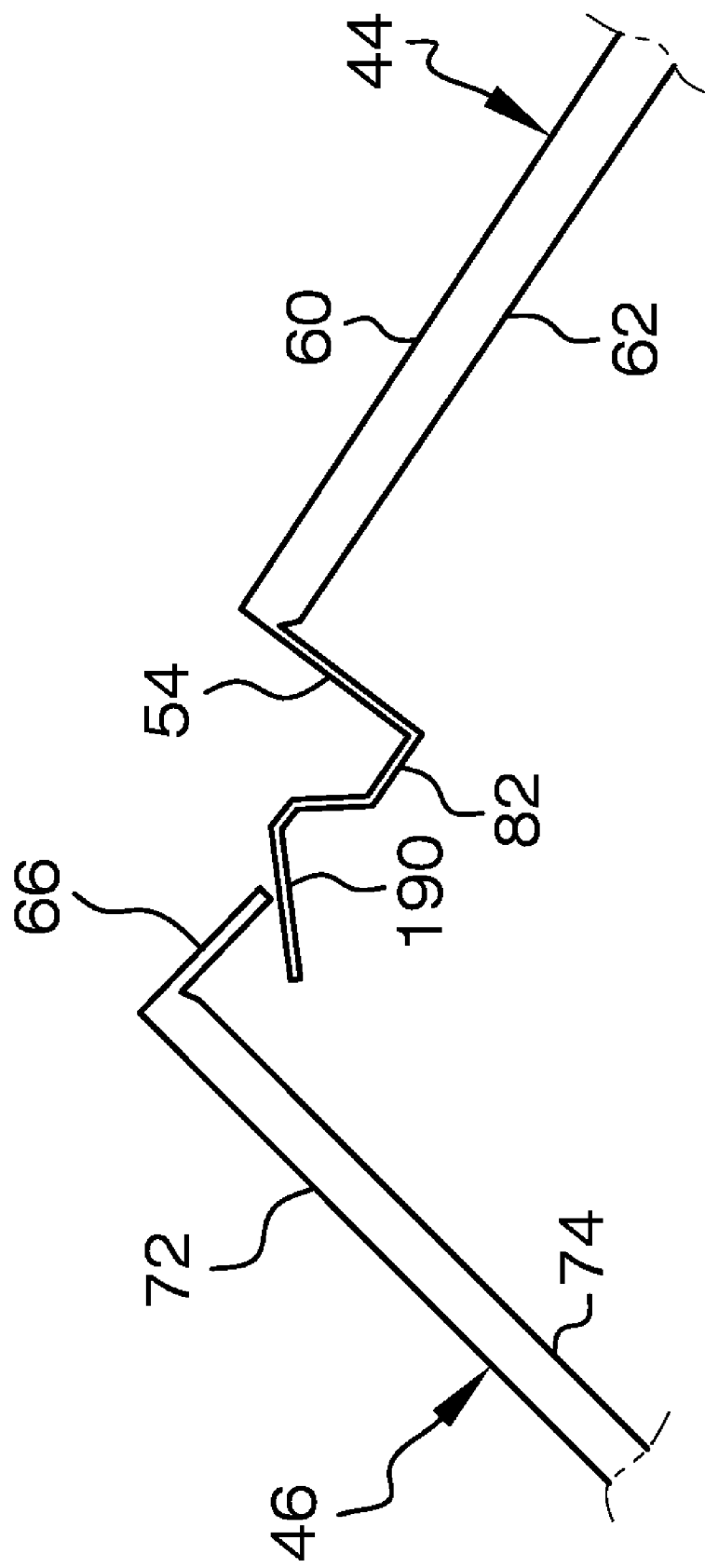
FIG. 11 is a diagrammatic partial front elevation view of the ends of the doors illustrating the engagement between the free ends of the doors.

With reference to FIG. 11, the second sides 54 and 66 may be engage with each other as the doors 44 and 46 are rotated into the closed position. The first door 44 may include a lip 82 extending from the second side 54 and may further include an anti-binding edge 190. The anti-binding edge 190 extends from the end of the lip 82. The anti-binding edge 190 may engage the second door 46 when the doors 44 and 46 are rotated into the closed position. The second side 66 of the second door 46 contacts the anti-binding edge 190 thereby flexing the anti-binding edge 190 downwardly. The anti-binding edge 190 guides the second side 66 of the second door 46 into engagement with the lip 82 when in the closed position. Further, when doors 44 and 46 are in the closed position the lip 82 and anti-binding edge 190 may serve as a rain channel to direct water off the cover assembly 12 that may have migrated between the second side 54 and 66.

As shown in FIG. 4, a first seal 134 may be positioned to seal the first side 52 of the first door 44 with the inside edge 84 of the first rail cap 40 when in the closed position. A second seal 136 may be positioned to seal the first side 64 of the second door 46 to with the inside edge 96 of the second rail cap 42 when in the closed position.

Figure 5:
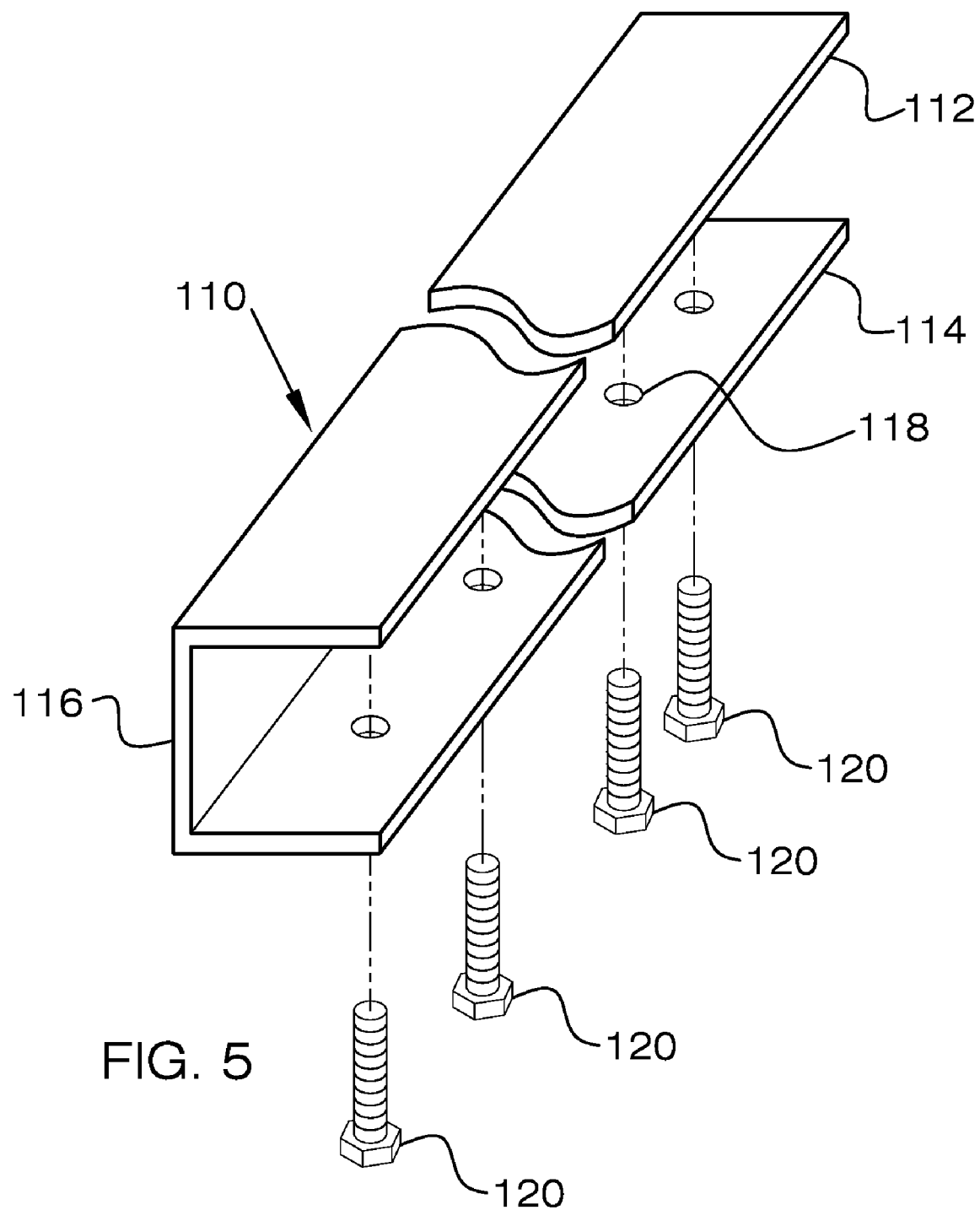
FIG. 5 is a perspective view of a clamping system for mounting the side rail caps to the side rails of the truck bed.

With reference to FIGS. 4 and 5, each rail cap attachments means 108 may include an elongated channel 110 having two legs 112 and 114 and a middle web portion 116 connecting the legs together. The channel 110 may have a c-shaped transverse cross section. Leg 114 includes a plurality of longitudinally spaced through holes 118. Each through hole 118 can threadably receive a thread fastener 120. One channel 110 may be used to removably secure the first side rail cap 40 to its respective side rail 24. A second channel 110 may be used to removably secure the second side rail cap 42 to its respective side rail 32.

The first side rail cap 40 is detachable secured by positioning the channel 110 with the ledge 92, ledge surface 94, and the side rail 24 between the two legs 112 and 114 of the channel. Then each of the plurality of threaded fasteners 120 are tightened to engage the bottom surface 30 of the side rail 24 which compresses the side rail 24 and the side rail cap 40 together. The second side rail cap 42 is detachably secured to side rail 32 in a like manner, as shown.

The leg 112 of the channel 110 may be dimensioned such that a longitudinal gap 122, 124 is created between the edge of the leg, and the inside edges 84 and 96 of the rail caps 40, 42. The gaps 122, 124 serves as rain channels to direct water off the cover assembly 12 that may have migrated past the respective seals 134, 136.

Figure 6:
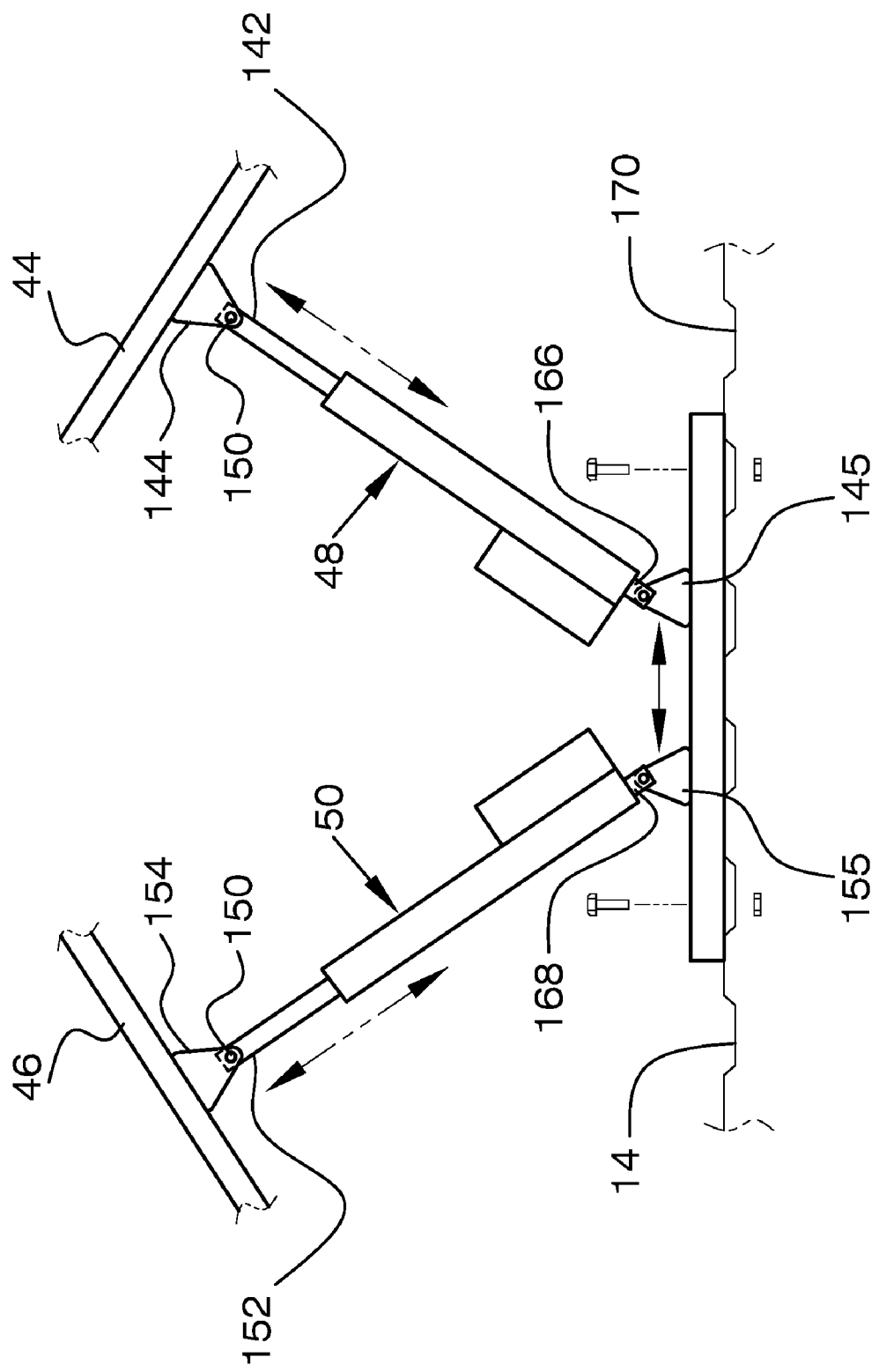
FIG. 6 is a diagrammatic elevation view of the actuator system for opening and closing the doors of the cover assembly.

With reference to FIGS. 1 and 6, the actuators 48 and 50 are operable to rotate the doors 44 and 46 about their respective hinge axes 128 and 132 between the closed and the open positions. The actuators 48 and 50 are power operated by a control system 174 (FIG. 8) and may be operated remotely by a transmitter or from within the cabin of the truck by a switch. The actuators 48 and 58 may be linear actuators each having an adjustable length. The control system 174 operates to adjust the length of each actuator 48 and 50. Extending the lengths of the actuators 48 and 50 effects positive angular rotation of the doors 44 and 46 about their respective hinge axes 128 and 132. Shortening the lengths of the actuators 48 and 50 effects negative angular rotation of the doors about their respective hinge axes 128 and 132. The actuators 48 and 50 may be operated by the control system 174 to position the doors 44 and 46 at any degree of rotation between zero and about ninety degrees about their respective hinge axes 128 and 132 to accommodate cargo of various heights. In this manner, the actuators 48 and 50 may be operated to close and hold the doors 44 and 46 down upon cargo positioned within the cargo area to aid in securing the cargo.

The first actuator 48 is connected to and extends between the first door 44 and the truck bed 10, and the second actuator 50 is connected to and extends between the second door 46 and the truck bed 10. The first actuator 48 may be connected at a first end 142 to the first door 44 by a swivel coupling assembly 144, and may be connected at a second end 166 to the truck bed 10 by a similar swivel coupling assembly 145. Likewise, the second actuator 50 may be connected at a first end 152 to the second door by a swivel coupling 154, and may be connected at a second end 168 to the truck bed 10 by a similar swivel coupling 155.

The second ends 166 and 168 may be connected by to the truck bed 10 by a track 170. The track 170 may be attached to the floor 14 of the truck bed 10 as shown, but could be attached to other portions of the truck bed, such as for example, the front wall 20. The second ends 166 and 168 may be longitudinally positionable along the track 170 to adjust the maximum angle of rotation of the doors 44 and 46 to accommodate truck beds having sidewalls of various heights. Positioning the ends 166 and 168 more inward on the track 170 will reduce the maximum angle of rotation while positioning the ends more outward on the track will increase the maximum angle of rotation. This is basically a function of the extension length of each actuator 48 and 50. By reducing the base distance between the ends 166 and 168 from the respective sidewalls 16 and 18 the angular rotation of the doors 44 and 46 is increased for a given fixed length of the actuator. Likewise, by increasing the base distance between the ends 166 and 168 from the respective sidewalls 16 and 18 the angular rotation of the doors 44 and 46 is decreased for a given fixed length of the actuator.

Figure 7:
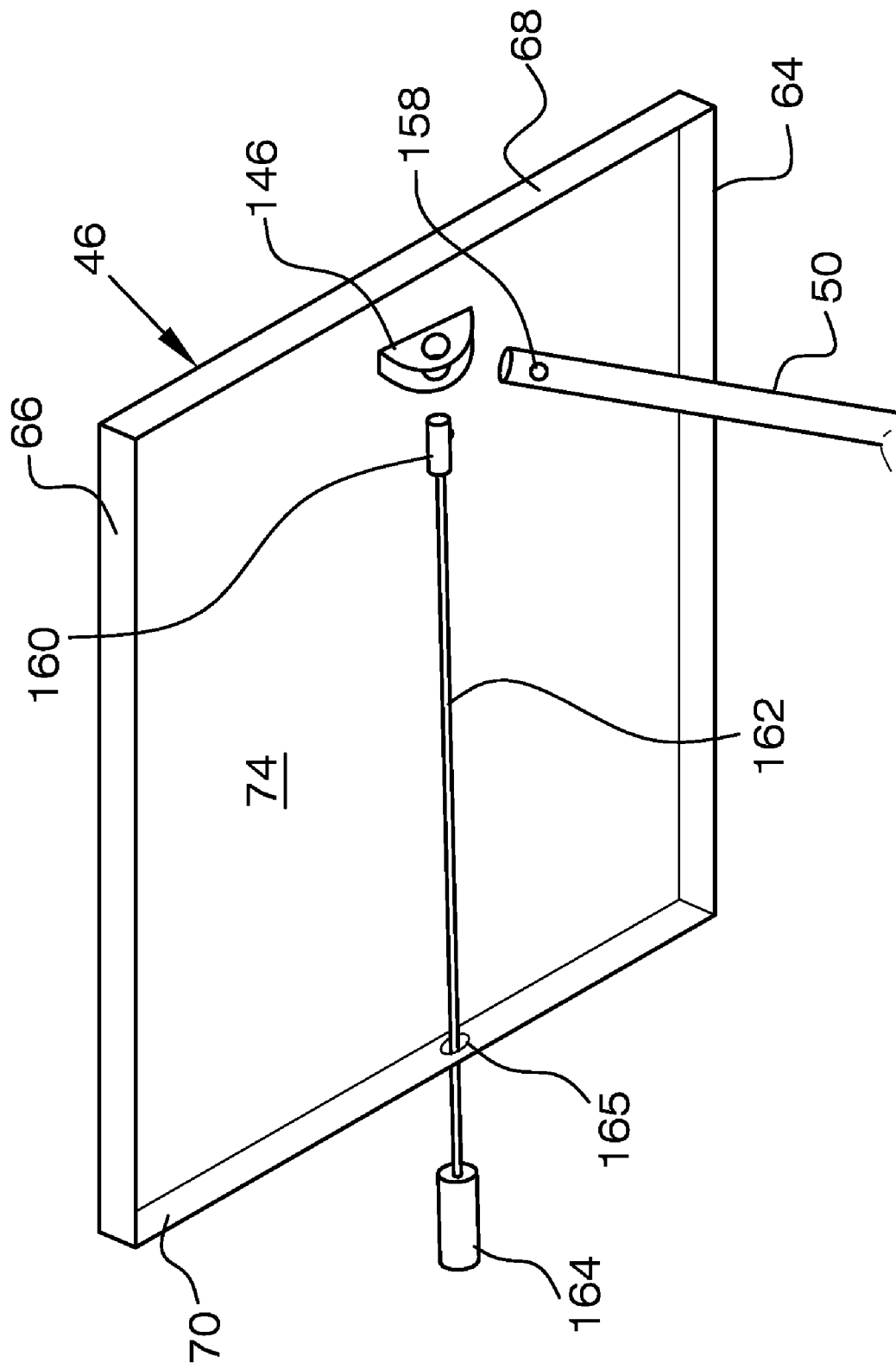
FIG. 7 is a diagrammatic perspective view of a quick release system for decoupling an actuator from a door.

With reference to FIGS. 6 and 7, each swivel coupling assembly 144, 145, 154 and 155 are alike and may include a loop member 146 removably coupled to an end of a respective actuator by a wrist pin 150 that is inserted through registered holes formed through the sides of the loop member and the end of the actuator. The wrist pin 150 may be secured by roll pins, cotter pins or the like (not shown).

Referring to FIGS. 2, 3 and 7, in case of a malfunction or failure of the control system 174 or one of the actuators 48 and 50, one of the swivel coupling assemblies, such as 154, which couples the first end 152 of actuator 50 to the second door 46 may be fitted with a wrist pin that is a quick release pin 160 enabling quick decoupling of the actuator 50 from the door 46. To facilitate this, a linkage cable 162 is connected at one end to the release pin 160 and is connected at an opposite end a lock assembly 164. The lock assembly 164 is removably received by a hole 165 formed through end 70. The lock assembly 164 operates to prevent removal of the assembly from the hole 165 when in a locked configuration, and permits removal of the assembly from the hole when in an unlocked configuration. During normal use of the door assembly 12, the lock assembly 164 will be locked in the hole 165. However, should the control system 174 or either actuator 48 and 50 fail, the second door 46 may be manually opened by unlocking the lock assembly 164 and pulling upon the linkage cable 162 to pull the release pin 160 from the swivel coupling assembly 154 and decoupling the actuator 50 from the second door. Once decoupled, the second door 46 may be manual opened.

Figure 8:
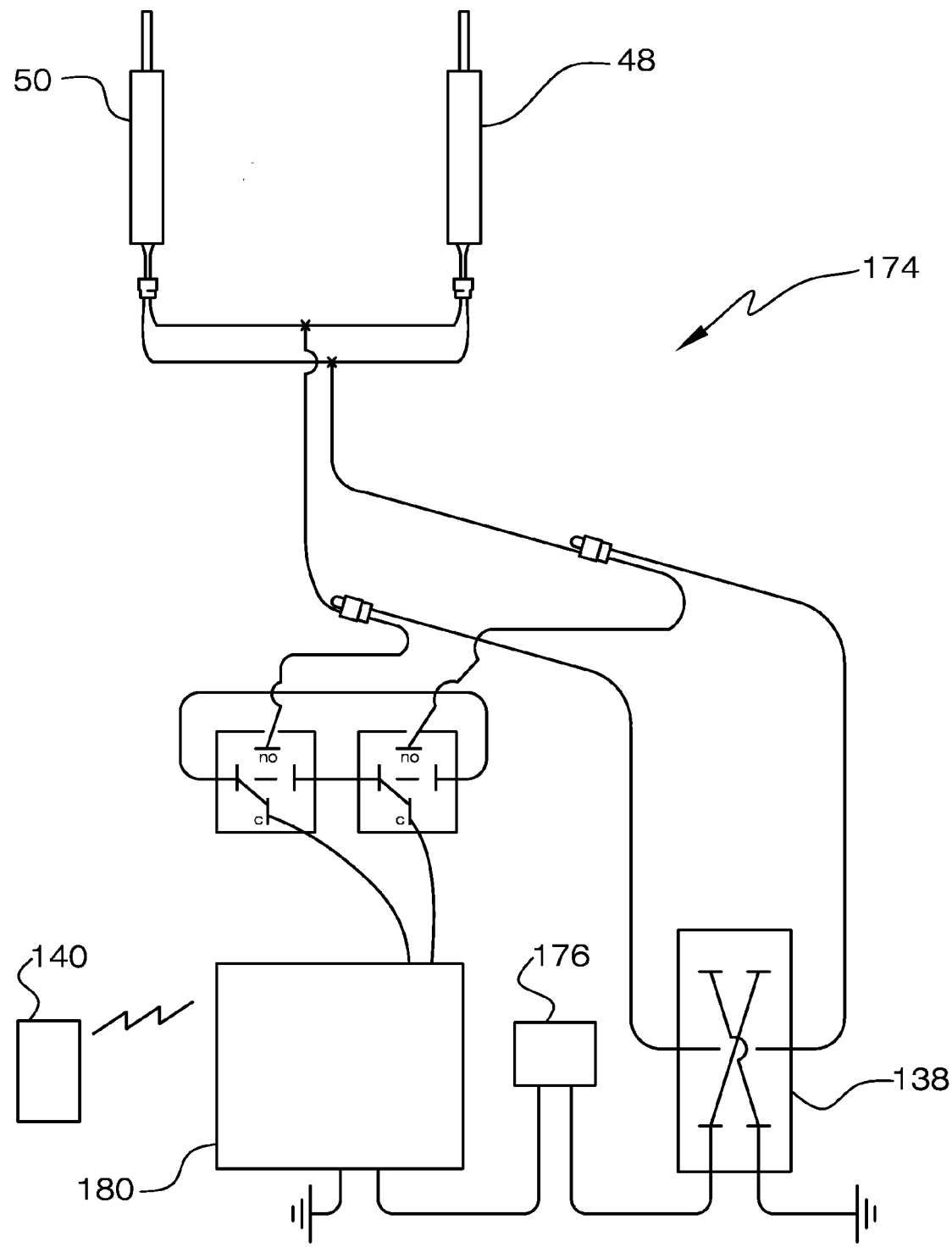
FIG. 8 is a schematic diagram of a control system for operating the actuators.

Turning now to FIG. 8, the control system 174 may include a power supply 176, such as the truck battery or a separate battery, connected to the actuators 48 and 50 by a switch 138 that is operable to provide power to the actuators from the power supply to open and close the doors 44 and 46. The switch 138 may be a normally open 3-position switch. Optionally, the control system 174 may include a remote control transmitter 140 and remote receiver 180 permitting remote operation of the door assembly 12 to open or close the doors 44 and 46.

The control system 174 may operate to rotate one door, such as the second door 46 faster than the first door 44 when the doors are being rotated in a positive angular rotation, such as for example from the closed position. The control system 174 may operate to rotate the first door 44 faster than the second door 46 when the doors are being rotated in a negative angular rotation, such as for example from an open position to the closed position. This operation ensures the first door 44 and second door 46 do not bind when opening and closing. This further ensures the appropriate door, such as the first door 44, is in the closed position prior to the second door 46 when closing, and that the second door 46 begins to open before the first door 44 when opening.

Figure 9:
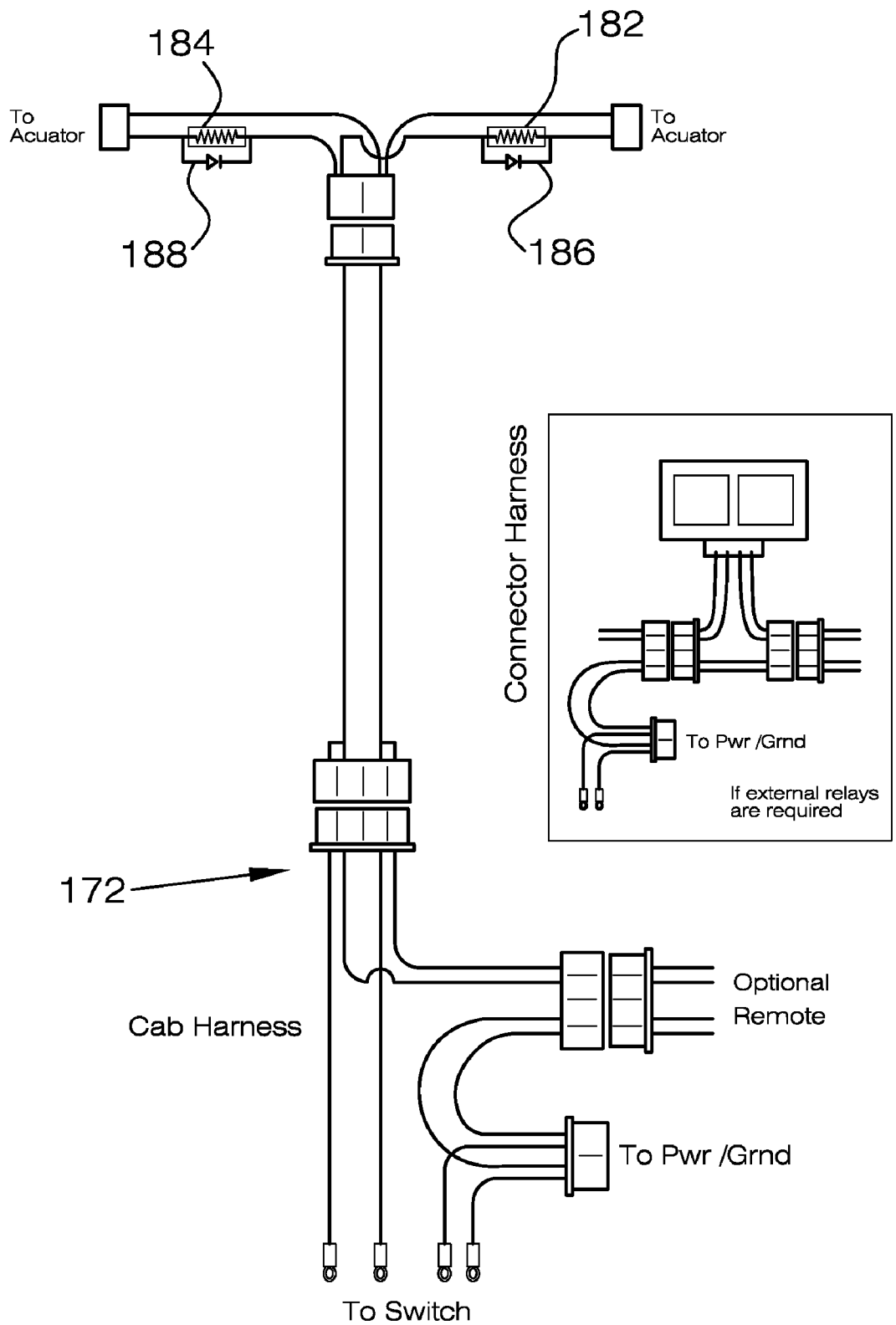
FIG. 9 is a schematic diagram of a wiring harness for connecting the various electrical components of the door assembly.

This operation may be achieved by connecting a resistor 182 with a matched diode 186 inline with one of the two control leads to the first actuator 48, and connecting a second resistor 184 with a matched diode 188 inline with one of the two control leads to the second actuator 50, as shown in FIG. 9. With this configuration, and when opening the doors 44 and 46 more power is supplied to the second actuator 50 than to the first actuator 48, causing the second door to open faster than the first door. When closing the doors 44, 46 more power is supplied to the first actuator 48 than to the second actuator 50 causing the first door 44 to close faster than the second door 46.

Alternatively, this operation may be achieved by connecting only the resistor 184 with the matched diode 188 inline with one of the two control leads to the second actuator 50. With this configuration, and when opening the doors 44 and 46 the same amount of power is supplied to the first and second actuators 44 and 50, causing the doors to open at the same speed. When closing the doors 44, 46 more power is supplied to the first actuator 48 than to the second actuator 50 causing the first door 44 to close faster than the second door 46.

FIG. 9 illustrates an exemplary wiring harness 172 that may be use to connect the components of the control system 174 to the actuators 48 and 50, and the optional remote control transmitter.

Figure 10:
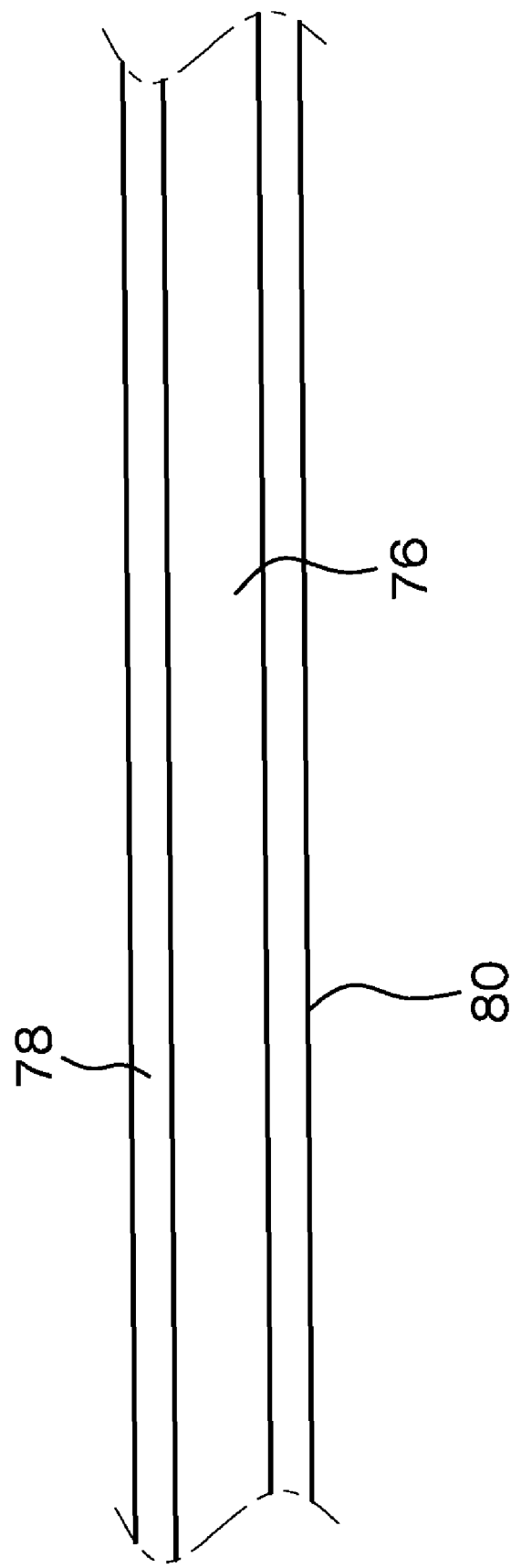
FIG. 10 is a partial cross sectional view through a door illustrating a laminate construction thereof.

With reference to FIG. 10, the doors 44 and 46 may be of a laminate construction having a core material 76 laminated between a first layer 78 and a second layer 80. The core 76 may strengthen the doors 44 and 46, and allow subsequent mounting of hardware to the doors.

A number of embodiments of the present invention have been described. Nevertheless, it will be understood that various modifications may be made without departing from the spirit and scope of the invention. Accordingly, other embodiments are within the scope of the following claims.

What is claimed is:

1. A cover assembly for covering an open top of a truck bed having two vertical sidewalls each having a top surface defining an inwardly extending side rail, the cover assembly comprising:

a first door and a second door, each of said doors having laterally spaced first and second sides and longitudinally spaced first and second ends;

a first side rail cap and a second side rail cap, each of said side rail caps having an inside edge, an outside edge, a top surface and a bottom surface, said inside edge defining a ledge having a ledge surface downwardly spaced from said top surface;

two or more rail cap attachment means;

said first side rail cap being detachably mountable to the side rail of one sidewall of the truck bed with said bottom surface of said first side rail cap in abutment with the side rail and with said inside edge facing inwardly, and being removably secured to the side rail by one of said two or more rail cap attachment means in engagement with said ledge surface of said first side rail cap and the side rail;

said second side rail cap being detachably mountable to the side rail of the other sidewall of the truck bed with said bottom surface of said second side rail cap in abutment with the side rail and with said inside edge facing inwardly, and being removably secured to the side rail by at least one of said two or more rail cap attachment means in engagement with said ledge surface of said second side rail cap and the side rail;

said first door being positionable and hingedly connectable at said first side thereof to said first side rail cap along said ledge thereof for rotation on a first hinge axis parallel to said inside edge of said first side rail cap permitting said second side of said first door to be swung between a closed position and open positions;

said second door being positionable and hingedly connectable at said first side thereof to said second side rail cap along said ledge thereof for rotation on a second hinge axis parallel to said inside edge of said second side rail cap permitting said second side of said second door to be swung between a closed position and open positions;

wherein said second sides of said first and said second doors rotate towards and away from one another between said closed position and said open positions, and being engagable with one another in said closed position; and said top surfaces of said first and said second doors being flush with said top surfaces of said first and said second rail caps respectively when said cover assembly is in said closed position.

2. The cover assembly of claim 1, further comprising:

a first actuator connectable to said first door and being operable to rotate said first door on said first hinge axis to swing said second end thereof between said closed position and said open positions; and a second actuator connectable to said second door and being operable to rotate said second door on said second hinge axis to swing said second end thereof between said closed position and said open positions.

3. The cover assembly of claim 2, wherein said first actuator is a linear actuator and is connectable at one end to said first door and is connectable at a second end to the truck bed; and wherein said second actuator is a linear actuator and is connectable at one end to said second door and is connectable at a second end to the truck bed.

4. The cover assembly of claim 3, further comprising:

a track;

wherein said second end of said first actuator is adjustably connectable at different longitudinal locations of said track; and wherein said second end of said second actuator is adjustably connectable at different longitudinal locations of said track.

5. The cover assembly of claim 2, wherein each of said first and said second actuators are independently operable to rotate said first door and said second door respectively at different speeds.

6. The cover assembly of claim 1, wherein each of said two or more rail cap attachment means includes:
 an elongated channel having two legs and a web portion connecting said two legs such that said channel has a c-shaped transverse cross section, one of said two legs defining a plurality of longitudinally spaced through holes;
 a plurality of threaded fasteners equal in number to said plurality of through holes, one each of said plurality of threaded fasteners being threadably receivable by a respective through hole; and
 said channel being positionable to removably secure a respective rail cap of said first and said second rail caps such that said ledge surface thereof and the respective side rail is positioned between said two legs of said channel, wherein each of said plurality of thread fasteners being tightenable to engage a bottom surface of the side rail, thereby compressing the said rail and said respective rail cap together.

7. The cover assembly of claim 1, wherein each of said two or more rail cap attachment means defines a rain channel that channels water thereoff.

8. The cover assembly of claim 1, wherein each of said first and said second doors is of a laminated construction, comprising:
 a first layer;
 a second layer; and
 a core material sandwiched between said first and said second layers.

9. The cover assembly of claim 2, further comprising:
 a release pin removably receivable by said first door and said first actuator to releasably couple said first door and said first actuator; and
 a linkage cable connected to said release pin and being operable to decouple said first door and said first actuator, thereby allowing said first door to be manually rotated.

10. A cover assembly for covering an open top of a truck bed having two vertical sidewalls each having a top surface defining an inwardly extending side rail, the cover assembly comprising:
 a first door and a second door, each of said doors having laterally spaced first and second sides and longitudinally spaced first and second ends;
 a first side rail cap and a second side rail cap, each of said side rail caps having an inside edge, an outside edge, a top surface and a bottom surface;
 two or more rail cap attachment means;
 said first side rail cap being detachably mountable to the side rail of one sidewall of the truck bed with said bottom surface of said first side rail cap in abutment with the side rail and with said inside edge facing inwardly, and being removably secured to the side rail by one of said two or more rail cap attachment means;
 said second side rail cap being detachably mountable to the side rail of the other sidewall of the truck bed with said bottom surface of said second side rail cap in abutment with the side rail and with said inside edge facing inwardly, and being removably secured to the said rail by at least one of said two or more rail cap attachment means;
 said first door being positionable and hingedly connectable at said first side thereof to said first side rail cap for rotation on a first hinge axis parallel to said inside edge of said first side rail cap permitting said second side of said first door to be swung between a closed position and open positions;
 said second door being positionable and hingedly connectable at said first side thereof to said second side rail cap for rotation on a second hinge axis parallel to said inside edge of said second side rail cap permitting said second side of said second door to be swung between a closed position and open positions;
 wherein said second sides of said first and said second doors rotate towards and away from one another between said closed position and said open positions, and being engagable with one another in said closed position;
 a first actuator connectable to said first door and being operable to rotate said first door on said first hinge axis to swing said second end thereof between said closed position and said open positions;
 a second actuator connectable to said second door and being operable to rotate said second door on said second hinge axis to swing said second end thereof between said closed position and said open positions;
 a release pin removably receivable by said first door and said first actuator to releasably couple said first door and said first actuator; and
 a linkage cable connected to said release pin and being operable to decouple said first door and said first actuator, thereby allowing said first door to be manually rotated.

11. The cover assembly of claim 10, wherein said first actuator is a linear actuator and is connectable at one end to said first door and is connectable at a second end to the truck bed; and wherein said second actuator is a linear actuator and is connectable at one end to said second door and is connectable at a second end to the truck bed.

12. The cover assembly of claim 11, further comprising:
 a track mountable to the truck bed;
 wherein said second end of said first actuator is connectable to said track at different longitudinal locations therealong; and
 wherein said second end of said second actuator is connectable to said track at different longitudinal locations therealong.

13. The cover assembly of claim 10, wherein each of said first and said second actuators are independently operable to rotate said first door and said second door respectively at different speeds.

14. The cover assembly of claim 10, wherein each of said first and said second rail caps define a ledge along said inside edge having a ledge surface downwardly spaced from said top surface;
 said first rail cap being removably secured to the side rail to which it is mountable by at least one of said two or more rail cap attachment means in engagement with said ledge surface of said frist side rail cap and the side rail;
 said second rail cap being removably secured to the side rail to which it is mountable by at least one of said two more rail cap attachment means in engagement with said ledge surface of said second rail cap and the side rail;
 said first door being positionable and hingedly connectable at said first side thereof to said first side rail cap along said ledge thereof;
 said second door being positionable and hingedly connectable at said first side thereof to said second side rail cap along said ledge thereof; and said top surfaces of said first and said second doors being flush with said top surfaces of said first and said second rail caps respectively when is said closed position.

15. The cover assembly of claim 14, wherein each of said two or more rail cap attachment means includes:
- an elongated channel having two legs and a web portion connecting said two legs such that said channel has a c-shaped transverse cross section, one of said two legs defining a plurality of longitudinally spaced through holes;
- a plurality of threaded fasteners equal in number to said plurality of through holes, one each of said plurality of threaded fasteners being threadably receivable by a respective through hole; and
- said channel being positionable to removably secure a respective rail cap of said first and said second rail caps such that said ledge surface thereof and the respective side rail is positioned between said two legs of said channel, wherein each of said plurality of thread fasteners being tightenable to engage a bottom surface of the side rail, thereby compressing the said rail and said respective rail cap together.

16. The cover assembly of claim 10, wherein each of said two or more rail cap attachment means defines a rain channel that channels water thereoff.

17. The cover assembly of claim 10, wherein each of said first and said second doors is of a laminated construction, comprising:
- a first layer;
- a second layer; and
- a core material sandwiched between said first and said second layers.

* * * * *